United States Patent [19]

Clouet

[11] Patent Number: 5,089,581
[45] Date of Patent: Feb. 18, 1992

[54] NOVEL POLYDIORGANOSILOXYLATED THIURAM DISULFIDES AND RADICAL POLYMERIZATION OF VINYL MONOMERS THEREWITH

[75] Inventor: Gilbert Clouet, La Wantzenau, France

[73] Assignee: Rhone-Poulenc Chimie, Courbevoie, France

[21] Appl. No.: 591,824

[22] Filed: Oct. 2, 1990

[30] Foreign Application Priority Data

Oct. 2, 1989 [FR] France .................. 89 13056

[51] Int. Cl.$^5$ .................................. C08G 77/06
[52] U.S. Cl. ........................ 528/12; 528/25; 528/21; 528/38
[58] Field of Search ............. 528/12, 25, 21, 38

[56] References Cited

U.S. PATENT DOCUMENTS

| | | | |
|---|---|---|---|
| 2,802,853 | 8/1957 | George et al. ............... | 528/25 |
| 2,813,846 | 11/1975 | Farber et al. ............... | 528/233 |
| 2,938,046 | 5/1960 | Morehouse ................. | 528/38 |
| 3,445,496 | 5/1969 | Ryan ........................ | 528/25 |
| 4,113,696 | 9/1978 | Williams et al. ............. | 260/448.2 |
| 4,584,356 | 4/1986 | Crivello ..................... | 525/479 |

OTHER PUBLICATIONS

Polymer, vol. 29, Oct. 1988, pp. 1909–1917, C. P. Reghunadhan Nair et al., "Functionalization of vinyl polymers through polymeric iniferters: synthesis of poly(-methylmethacrylate-b-phosphonamide) and poly(-styrene-b-phosphonamide)", * p. 1910, column 2, par. 2, p. 1911, p. 1917, column 1, paragraph 2*.

Journal of Applied Polymer Science, vol. 29, No. 3, Mar. 1984, pp. 877–889, New York, US, H. Inoue et al: "Surface Photografting of Hydrophilic Vinyl Monomers onto Diethyldithiocarbamated Polydimethylsiloxane"*p. 877*.

*Primary Examiner*—Melvyn I. Marquis
*Assistant Examiner*—M. W. Glass
*Attorney, Agent, or Firm*—Burns, Doane, Swecker & Mathis

[57] ABSTRACT

Novel polydiorganosiloxane substituted thiuram disulfides have the formula:

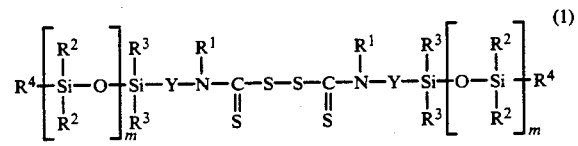

and are useful for the radical polymerization of vinyl monomers to produce polydiorganosiloxane/-polyvinyl/polydiorganosiloxane block copolymers having improved physical properties.

4 Claims, No Drawings

NOVEL POLYDIORGANOSILOXYLATED THIURAM DISULFIDES AND RADICAL POLYMERIZATION OF VINYL MONOMERS THEREWITH

BACKGROUND OF THE INVENTION

1. Field of the Invention

The present invention relates to novel polydiorganosiloxane substituted (grafted) thiuram disulfides, to a process for the preparation of such novel disulfides and to use thereof in the radical polymerization of vinyl monomers.

2. Description of the Prior Art

*Makromol. Chem. Rapid. Commun.*, 3, 127–132 (1982) describes the use of tetraalkylthiuram as an additive during the radical polymerization of vinyl monomers, such additive being designated an "iniferter" because during this polymerization it serves the triple function of free radical initiator, of chain transfer agent and of chain terminator.

U.S. Pat. No. 2,813,849 describes the use, inter alia, of tetraalkylthiuram disulfides as thermal initiators for the polymerization of acrylonitrile, methacrylonitrile, styrene and alkyl methacrylates.

EP-A-237,792 describes a process for the preparation of telechelic polymers by radical polymerization of ethylenic monomers in the presence of thiuram disulfide derivatives or of dithiocarbamate derivatives which have at least one reactive organic functional group.

The above processes, however, do not enable the preparation of polydiorganosiloxane/vinyl polymer/polydiorganosiloxane three-block copolymers utilizing a process of radical polymerization of vinyl monomers.

Indeed, it is well known to this art that, despite their particularly advantageous physicochemical properties, polydiorganosiloxanes must have particularly high molecular weights in order to exhibit adequate mechanical properties. However, even after crosslinking, unfilled polymers exhibit a rupture strength, a tear strength and an elongation which are rather mediocre. One solution to this problem would be to provide block or sequential copolymers having polydiorganosiloxane segments and crystalline or semicrystalline polymeric segments.

Need continues to exist in this art for an industrial process permitting preparation of such copolymers.

SUMMARY OF THE INVENTION

Accordingly, a major object of the present invention is the provision of novel polydiorganosiloxane substituted thiuram disulfides which avoid those disadvantages and drawbacks to date characterizing the state of this art.

Briefly, the present invention features novel polydiorganosiloxane substituted thiuram disulfides having the formula:

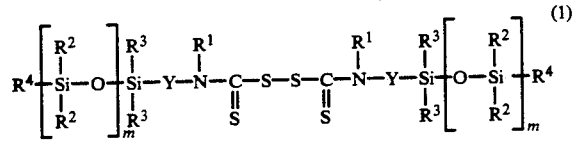

in which the symbols $R_1$, which may be identical or different, are each a linear or branched chain $C_1$–$C_{12}$ alkyl radical optionally interrupted by an O or N heteroatom and optionally substituted by a tertiary amine group, a $C_3$–$C_8$ cycloalkyl radical, or an aryl, aralkyl or alkylaryl radical; the symbols Y, which may be identical or different, are each a divalent organic radical bonded to the silicon atom by an Si-C bond; the symbols $R^2$, which may be identical or different, are each a linear or branched chain $C_1$–$C_{12}$ alkyl radical, a 3,3,3-trifluoropropyl radical, or a phenyl radical; the symbols $R^3$, which may be identical or different, are each a radical $R^2$ or an alkoxy radical having from 1 to 8 carbon atoms; the symbols $R^4$, which may be identical or different, are each a radical $R^3$ or a hydroxyl radical; and m is an integer ranging from 1 to 500, preferably from 2 to 200.

DETAILED DESCRIPTION OF THE PREFERRED EMBODIMENTS OF THE INVENTION

More particularly according to the present invention, the polymers of formula (1) are advantageously prepared by reacting a polydiorganosiloxane of the formula:

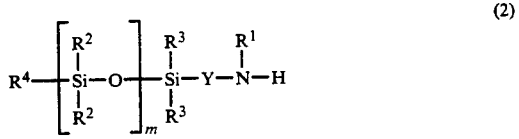

in which $R^1$, $R^2$, $R^3$, Y and m are as defined above in respect of the formula (1), with carbon disulfide, in the presence of an oxidizing agent such as molecular iodine and of a tertiary amine.

Triethylamine and pyridine are exemplary such tertiary amines.

It is desirable to carry out the reaction by utilizing a molar ratio of the polymer (2) to $CS_2$ which is preferably slightly higher than 1 and in the presence of at least one mole of tertiary amine per mole of polymer (2).

The reaction is exothermic. Its exothermicity can be controlled by those means typically employed in this art.

The reaction can be carried out in a solvent medium or in bulk. In the latter case, the $CS_2$ can serve as a solvent.

The polydiorganosiloxane (2) can, in particular, itself be prepared according to either of the following two processes:

(i) by a first process where $R^3$ is identical with $R^2$, entailing reacting an s-hydropolydiorganosiloxane of the formula:

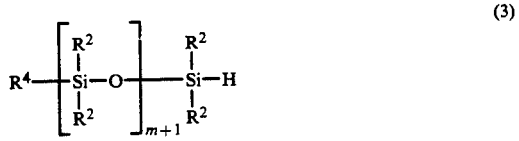

with an organic compound containing a secondary amine functional group and olefinic unsaturation, of the formula:

in the presence of a catalytically effective amount of a catalyst based on platinum or based on a metal of the platinum group (rhodium, osmium, rhenium, and the like).

In the formulae (3) and (4), the symbols $R^1$, $R^2$ and $R^4$ and m are as defined above, and Y' is identical with Y except that it additionally contains a site olefinic unsaturation.

The platinum catalysts employed for carrying out the hydrosilylation reaction of the polymers of formula (3) with the organic compound of formula (4) are abundantly described in the literature; particularly representative thereof are chloroplatinic acid $H_2PtCl_6$, complexes of platinum and of an organic product described in U.S. Pat. Nos. 3,159,601, 3,159,602 and 3,220,972 and European Patents EP-A-57,459, EP-A-188,978 and EP-A-190,530 and the complexes of platinum and of vinylated organopolysiloxane which are described in U.S. Pat. Nos. 3,419,593, 3,377,432 and 3,814,730.

To react the SiH-containing polymer of formula (3) with the compound of formula (4), an amount of platinum catalyst, calculated as the weight of platinum metal, is generally employed, ranging from 5 to 600 ppm, preferably from 10 to 200 ppm, based on the weight of the SiH-containing polymer of formula (3).

The hydrosilylation reaction can be carried out in bulk or in a volatile organic solvent such as toluene, heptane, xylene, tetrahydrofuran and tetrachloroethylene.

This reaction is preferably carried out in the absence of any aprotic solvent (for example water and alcohol).

It is generally desirable to heat the reaction mixture to a temperature ranging from 60° to 120° C. for the period of time required to complete the reaction. Furthermore, it is desirable to add the SiH-containing polymer dropwise to the compound of formula (4), optionally in solution in an organic solvent.

Completion of the reaction is monitored by determining the residual SiHs using alcoholic potassium hydroxide and the solvent is then removed, for example by distillation under reduced pressure.

The functionalized polymer of formula (2) which is obtained can be purified, for example by being passed through a silica absorbent column.

Particularly representative compounds of formula (4) are the N-(monosubstituted)allylamines of the formula:

$$CH_2=CH-CH_2-NHR_1$$

wherein $R_1$ is preferably a methyl, ethyl, propyl, phenyl or cyclohexyl radical.

(ii) By a second process, where $R^3$ may additionally be a hydrolyzable group selected from among alkoxy radicals having from 1 to 8 carbon atoms, entailing reacting an ω-hydroxypolydiorganosiloxane of the formula:

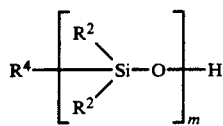

(3)

with an aminotrialkoxysilane of formula:

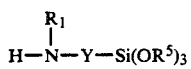

(6)

in which the symbols $R^1$, $R^2$ and m are as defined above and the radicals $R^5$, which may be identical or different, are each a $C_1-C_8$ alkyl or alkoxyalkyl radical; $R^5$ is preferably methyl or ethyl.

The condensation reaction between the polymer (5) and the silane (6) is carried out at a temperature ranging from 40° to 140° C., preferably in a solvent medium, for a sufficient period of time to remove the amount of alcohol $R^5OH$ which is produced. Silanes of formula (6) which can be employed are described, in particular, in U.S. Pat. Nos. 3,888,815, 4,481,364 and 4,556,722.

Exemplary of the silanes of formula (6), particularly representative are the silanes of the formulae:

$(CH_3O)_3Si(CH_2)_3NHCH_3$

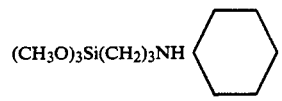

$(C_2H_5O)_3Si(CH_2)_3NHCH_3$
$(CH_3O)_3Si(CH_2)_3NH(CH_2)_2NH_2$
$(C_2H_5O)_3Si(CH_2)_3NH(CH_2)_2NH_2$
$(CH_3O)_3Si(CH_2)_4NHCH_3$
$(CH_3O)_3Si(CH_2)_3-S-(CH_2)_2NHC_2H_5$
$(CH_3O)_3Si(CH_2)_3-O-(CH_2)_2NHCH_3$
$(CH_3O)_3Si(CH_2)_3NH(CH_2)_2-S-CH_3$.

In the above formulae (1) to (6), exemplary radicals $R_1$ are methyl, ethyl, propyl, butyl, 2-ethylhexyl, n-octyl, dodecyl, cyclopentyl, cyclobutyl, phenyl, benzyl and tolyl.

Y is preferably a $C_1-C_8$, preferably $C_3-C_8$, linear or branched chain alkylene recurring structural unit optionally interrupted by a heteroatom selected from 0 and S.

Exemplary of the recurring structural units Y, particularly representative are:

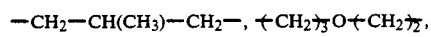

Examples of the alkyl radicals $R^2$ are the same as those for the radicals $R_1$; $R_1$ is preferably a methyl or phenyl radical. Consequently, the diorganopolysiloxane segment contains chiefly units chosen from dimethylsiloxy, methylphenylsiloxy and diphenylsiloxy.

At least 50% of the number of the radicals $R^2$ are preferably methyl radicals.

The present invention also features using the product of formula (1) as a "macroiniferter" agent during the radical polymerization of vinyl monomers.

The product of formula (1) is deemed a "macroiniferter" because it has now been demonstrated that this polymer serves the triple function of polymerization initiator, chain transfer agent and chain terminator during the radical polymerization of vinyl monomers.

Exemplary such vinyl monomers are:

(i) acrylic and methacrylic monomers, particularly $C_1-C_{12}$ alkyl acrylates and methacrylates such as methyl methacrylate, ethyl methacrylate, isopropyl methacrylate or n-butyl methacrylate;

(ii) acrylic and methacrylic monomers bearing at least one hydroxyl group, such as hydroxyethyl methacrylate, hydroxypropyl methacrylate, diethylene glycol methacrylate, dipropylene glycol methacrylate, triethylene glycol methacrylate and the corresponding acrylates;

(iii) acrylamide and methacrylamide monomers;

(iv) styrene monomers such as styrene, α-methylstyrene, tert-butylstyrene and vinyltoluene.

Without wishing to be bound by or to any particular scientific theory, the radical reaction is believed to proceed according to the following reaction scheme:

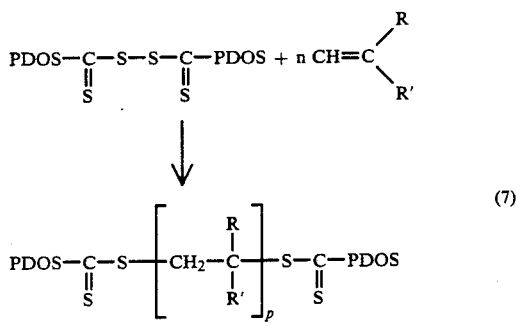

(7)

wherein PDOS indicates a polydiorganosiloxane block.

In formula (7), p indicates the degree of polymerization of the vinyl monomer and p advantageously ranges from 50 to 1,000, preferably from 50 to 300.

The polymerization reaction is carried out at a temperature ranging from 50° to 160° C., preferably from 60° to 90° C.

It is preferably carried out in bulk in the event that the "macroiniferter" is soluble in the vinyl monomer, as, for example, in the case of styrene and of methyl methacrylate. Contrariwise, for example in the case of acrylamide, a solvent such as, for example, THF (tetrahydrofuran) is employed.

During the radical polymerization the polyvinyl block is inserted between the two sulfurs of the thiuram group. The molecular weight of the polyvinyl blocks depends on the vinyl monomer/"macroiniferter" molar ratio.

The amount of "macroiniferter" which is introduced typically ranges from 1 to 50 parts by weight, preferably from 2 to 20 parts, per 100 parts by weight of vinyl monomer. When the amount of "macroiniferter" which is introduced is large, the polymerization rate decreases, the "macroiniferter" then serving principally as a terminating agent for the polymer radicals.

Furthermore, at the time of the polymerization, an oxidizing agent such as $I_2$ can be added to the reaction mixture constituted of vinyl monomers, of polymer of formula (2), of $CS_2$ and of the tertiary amine, with a view to providing, in situ, a redox system which makes it possible to lower the decomposition temperature of the polydiorganosiloxane/thiuram disulfide copolymer.

The polydiorganosiloxane/polyvinyl three-block copolymer always has chain ends which are polydiorganosiloxane blocks.

This three-block structure is therefore of the PA-PB-PA type, where PA is a polydiorganosiloxane sequence and PB is a vinyl sequence, with the PA emanating from the macroiniferter of formula (1).

This process of radical copolymerization according to the invention therefore provides a novel route for synthesizing copolymers of well-defined chemical structure and which are thermally stable up to a temperature of 200° C. and even greater.

In order to further illustrate the present invention and the advantages thereof, the following specific examples are given, it being understood that same are intended only as illustrative and in nowise limitative.

EXAMPLE 1

Example (1.a)

Synthesis of an ω-(N-methylaminopropyl)polydimethylsiloxane 15 g of an α-trimethylsiloxy blocked ω-SiH polydimethylsiloxane (number average molecular weight $\overline{M}n = 3,400$) were dissolved in 50 ml of toluene and were dried by azeotropic distillation.

0.75 ml of N-allylmethylamine containing 7.5 mg of $H_2PtCl_6$ dissolved in the N-allylmethylamine were then added under argon.

The reaction mixture was heated slowly for 90 min to 90° C., with stirring, and the temperature was then increased to 120° C. over 1 hour and the reaction mixture was maintained at 120° C. for 12 hours. The excess amine was removed under a partial vacuum at this temperature. The catalyst was removed by dissolving the reaction mixture in heptane and washing with water. After drying over $Na_2SO_4$, the heptane was removed under partial vacuum.

It was determined that the desired polymer was actually obtained, using viscometry and an NMR (nuclear magnetic resonance) spectrum.

Example (1.b)

Synthesis of the macroiniferter 14 g of the product obtained in Example (1.a) were dissolved in 50 ml of $CHCl_3$. 1 ml of triethylamine and 0.5 g of $CS_2$ were added. The mixture was reacted for one hour at room temperature (25° C.). A solution of $I_2$ in $CHCl_3$ was then added dropwise with stirring until the violet color persisted. The $CHCl_3$ solution thus obtained was washed with water and dried over $Na_2SO_4$ for at least 24 hours. $CHCl_3$ was removed by evaporation under reduced pressure at room temperature. The oil whose chemical formula below was monitored by viscometry and by spectroscopic analyses was recovered quantitatively:

$$CH_3\underset{CH_3}{\overset{CH_3}{-\underset{|}{\overset{|}{Si}}-O}}\underset{CH_3}{\overset{CH_3}{\underset{|}{\overset{|}{Si}}}}\underset{CH_3}{\overset{CH_3}{\underset{|}{\overset{|}{Si(CH_2)_3N}}}}-\overset{S}{\overset{\|}{C}}-S-S-\overset{S}{\overset{\|}{C}}-N(CH_2)_3\underset{CH_3}{\overset{CH_3}{\underset{|}{\overset{|}{Si}}}}\left[\underset{CH_3}{\overset{CH_3}{-O-\underset{|}{\overset{|}{Si}}}}\right]_{44}CH_3$$

EXAMPLES 2 to 13

Radical polymerization of a styrene monomer (Examples 2 to 7) or of a methyl methacrylate monomer (Examples 8 to 13) using the "macroiniferter" of Example (1.b)

Operating procedure: The polymerizations were carried out in a 110×140 mm sealed glass tube under a reduced pressure of 0.133 kPa. Since the "polyiniferter" was soluble in vinyl monomers, the reaction was carried out in bulk.

The content of the tube was deaerated by at least three cycles of freezing, applying vacuum and thawing. The tube was then sealed at a pressure of 13.3 Pa.

The tube was immediately wrapped in aluminum paper and the polymerization was carried out in an oil bath at the required temperature for the desired period of time. After the polymerization, the tube was removed, cooled in a mixture of dry ice and isopropanol and the polymer, diluted with tetrahydrofuran, was precipitated dropwise in methanol. The precipitate or the resinous product obtained was collected in a sintered glass crucible, washed with petroleum ether, dried at 45° C. overnight and recovered.

Various polymerizations of styrene (Examples 2 to 7) or of methyl methacrylate (Example 8 to 13) were carried out while varying the concentration ZCE in grams of "macroiniferter" per 100 ml of monomer, the temperature (g) and the polymerization time (t) in hours. The copolymer obtained was characterized by its number-average molecular weight $\overline{M}n$, its weight-average molecular weight $\overline{M}w$; the polydispersity index $Ip = \overline{M}w : \overline{M}n$; the weight percentage of polydimethylsiloxane (D %) and ED the degree of conversion of the vinyl monomers obtained at the end of the reaction.

The results obtained are reported in Tables I and II below:

TABLE I

| Example | [C] | t | Θ °C. | $\overline{M}n \times 10^{-4}$ | IP | ED % | D % |
|---|---|---|---|---|---|---|---|
| 2 | 10 | 24 | 85 | 18.6 | 2.5 | 95 | 3.76 |
| 3 | 20 | 24 | 85 | 10.5 | 4.0 | 98 | 6.66 |
| 4 | 30 | 24 | 85 | 10.0 | 2.3 | 93 | 7.0 |
| 5 | 40 | 24 | 85 | 9.5 | 2 | 96 | 7.4 |
| 6 | 50 | 48 | 85 | 7.3 | 1.5 | 98 | 9.6 |
| 7 | 70 | 48 | 90 | 6.0 | 1.4 | 95 | 11.6 |

TABLE II

| Example | [C] | t | Θ °C. | $\overline{M}n \times 10^{-4}$ | IP | ED % | D % |
|---|---|---|---|---|---|---|---|
| 8 | 10 | 24 | 85 | 8.5 | 1.9 | 95 | 8.2 |
| 9 | 15 | 24 | 85 | 7.2 | 1.8 | 98 | 9.7 |
| 10 | 25 | 24 | 85 | 6.5 | 1.8 | 95 | 9.7 |
| 11 | 30 | 24 | 85 | 5.7 | 1.9 | 98 | 10.7 |
| 12 | 50 | 48 | 85 | 4.31 | 1.4 | 98 | 12.3 |
| 13 | 70 | 48 | 90 | 3.9 | 1.4 | 95 | 17.9 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A polydiorganosiloxane substituted thiuram disulfide having the formula:

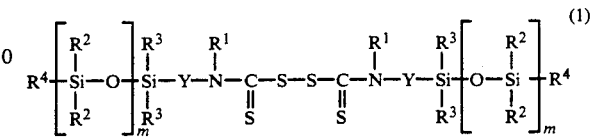

in which the symbols $R^1$, which may be identical or different, are each a linear or branched chain $C_1$–$C_{12}$ alkyl radical optionally interrupted by an O or N heteroatom and optionally substituted by a tertiary amine group, a $C_3$–$C_8$ cycloalkyl radical, or an aryl, aralkyl or alkylaryl radical; the symbols Y, which may be identical or different, are each a divalent organic radical bonded to the silicon atom by an Si—c bond; the symbols $R^2$, which may be identical or different, are each a linear or branched chain $C_1$–$C_{12}$ alkyl radical, a 3,3,3-trifluoropropyl radical, or a phenyl radical; the symbols $R^3$, which may be identical or different, are each a radical $R^2$ or an alkoxy radical having from 1 to 8 carbon atoms; the symbols $R^4$, which may be identical or different, are each a radical $R^3$ or a hydroxyl radical; and m is an integer ranging from 1 to 500.

2. The polydiorganosiloxane substituted thiuram disulfide as defined by claim 1, wherein $R_1$ is methyl or cyclohexyl, $R^2$ is methyl and/or phenyl, Y is —$CH_2$)$_3$ and $R^3$ is methyl or $C_1$–$C_8$ alkoxy.

3. A process for the preparation of the polydiorganosiloxane substituted thiuram disulfide as defined by claim 1, comprising reacting a polydiorganosiloxane of the formula:

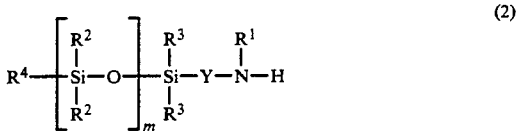

with carbon disulfide, in the presence of an oxidizing agent and of a tertiary amine.

4. The process as defined by claim 3, said oxidizing agent comprising iodine and said tertiary amine comprising triethylamine.

* * * * *